United States Patent
Rink et al.

(10) Patent No.: US 7,440,433 B2
(45) Date of Patent: Oct. 21, 2008

(54) MOBILE IP NOTIFICATION

(75) Inventors: Fred Rink, Fairview, TX (US); Steven Currin, McKinney, TX (US); Jerry Mizell, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1224 days.

(21) Appl. No.: 10/741,953

(22) Filed: Dec. 19, 2003

(65) Prior Publication Data

US 2005/0147069 A1    Jul. 7, 2005

(51) Int. Cl.
*H04Q 7/24* (2006.01)
(52) U.S. Cl. .............. 370/338; 455/552.1; 455/557
(58) Field of Classification Search ............. 370/338, 370/352, 355, 395.52; 455/414.1, 426.2, 455/552.1, 557

See application file for complete search history.

(56) References Cited

U.S. PATENT DOCUMENTS 6,144,671 A * 11/2000 Perinpanathan et al. ..... 370/409

* cited by examiner

*Primary Examiner*—Temica M Beamer
(74) *Attorney, Agent, or Firm*—Garlick Harrison & Markison; James A. Harrison

(57) ABSTRACT

A home agent and a mobile terminal communicate to facilitate the home agent becoming aware of whether the mobile terminal is notification capable meaning the mobile terminal is able to receive notifications of specified events without an open browser window. If the mobile terminal is notification capable, the home agent provides notifications based upon specified events and conditions. The mobile terminal then provides an indication of the notification to the user even though a browser window is not open for displaying user messages. More specifically, the mobile IP registration process according to a mobile IP protocol is modified to add parameter extensions that allow the mobile terminal to provide this indication that it is notification capable. The home agent is notification capable as well and provides specified notifications to the mobile terminal upon the occurrence of a specified event either in a registration reply or during a data session or call.

20 Claims, 5 Drawing Sheets

Communication network

MOBILE IP NOTIFICATION

BACKGROUND

1. Technical Field

The present invention relates to mobile communication devices and, more particularly, the present invention relates to mobile terminals communicating in one of a mobile IP or a simple IP network.

2. Related Art

The Internet, as we know it today, began as a joint project between the Department of Defense's (DoD's) Advanced Research Project Agency (ARPA) and the United Kingdom's National Physics Lab (NPL) during the height of the Cold War. When planning started in 1967, the project was conceived to distribute communications and data through a dispersed network of highly interconnected network nodes with high redundancy. A decision was made, based on research at the NPL, to move data through the network using a technique called "message switching", or packet switching as it is called today. In order to exchange data, each node was assigned a unique address in relation to the addresses assigned to all other nodes. The address scheme devised was a 32-bit number comprising a network part and a host (network node) part. By 1971, 15 nodes, mostly at universities, were connected to the ARPA network (ARPANET). They were linked for time sharing to support a variety of remote terminals and allowed data transfers between distant computers.

The early 1970s produced a number of products that would effect the development of the ARPANET. The Palo Alto Research Center (PARC), funded by Xerox Corporation, developed a graphical user interface (GUI), a computer pointing device called a mouse, and most importantly, an Ethernet protocol, for inter-connecting computers that allowed users to send and receive electronic mail and share files.

At the same time that ARPANET was being develop for institutional use, the first personal computer was introduced by Altair in 1975. Sold as a kit, it was an instant success with computer enthusiast but its sales were limited due to the technical skill required to assemble the kit. It did, however, confirm that a market existed for a personal computer. Thus, in 1981, International Business Machines (IBM) introduced the Personal Computer (PC) which became the defacto industry standard. The IBM PC was an open architecture machine, meaning IBM published all technical details of the PC. This fact allowed low cost providers to produce PC "clones" so consumers were able to purchase personal computers at affordable prices. Low cost dial-up modems allowed PC users to download files from bulletin boards.

By the late 1980s, the ARPANET was almost 20 years old. The DoD split the ARPANET into two distinct parts for specific uses. One part was reserved for military sites (known as MILNET), while the second part of the ARPANET was for civilian use. Management of the ARPANET was turned over to the National Science Foundation (NSF) with NSF regional networks forming the backbone of the re-named Internet. Commercial Internet Service Providers (ISPs) began offering Internet Access Points (APs) through which large numbers of PC users began accessing the Internet. These PCs were desktop machines whose location was not likely to change, thus creating a home network for ISPs.

As technology evolved, smaller, more powerful laptop PCs became available. Their size released them from the desktop and the office. Sales, marketing, and technical personnel could take the laptop PCs on the road while maintaining contact with the office through remote applications such as e-mail and file transfers. These laptop PCs created mobile users that wanted to access the Internet while moving between networks, thereby causing a transition from a centralized system to a distributed system. Moreover, advances in wireless technology made wireless networking possible. Using a mobile IP protocol, laptop PCs, personal digital assistants (PDAs) and mobile phones equipped for web browsing could access the Internet. Using either a static or dynamic mobile IP address assigned by their home networks, these mobile users or mobile terminals accessed the Internet from any available Internet access point.

Along these lines, mobile IP standards have evolved to facilitate mobility for wireline and wireless coupled user terminals (hereinafter, "mobile terminals"). When a mobile terminal changes its access point from its home network to a visited (foreign) network, it does not change its mobile IP address. Home agents (HA) are special servers responsible for routing data packets to absent mobile terminals. The HA is informed of the absent mobile terminal's location when the mobile terminal registers with the foreign network. The server on the foreign network, the foreign agent (FA), provides its IP address (care-of address) to the HA during mobile terminal registration. After registration, the FA is responsible for routing data packets between the mobile terminal and home network via the HA.

Within the world of wireless communications, differing billing rates and services are often offered according to time of day, quality of service and guaranteed throughput rates. For example, some services are offered in which a certain type of continuous-bit-rate data, so called streaming data, is provided at a specified price. For example, there are subscription based music and video services that are readily available. There are also subscription based stock market services and other services in which data is provided for a fee. While such application specific services often are offered at a flat rate, data rate guarantees result in differing transmission rates. Moreover, as the different technologies evolve, the access technology that is utilized to gain access to various application servers is also rate dependent. For example, if an access technology includes a cellular network to provide access to the Internet, then the access technology on its own provides a use based rate. Moreover, if certain quality of service or throughput rates are expected or guaranteed for the access, then different rates may apply according to the throughput rate which is requested or used. On the other hand, if a wireless local area network is used to provide access to a data packet network, such as the Internet, then there may be no service fees associated therewith aside from, perhaps, monthly fees.

One problem that exists in mobile IP and simple IP networks is that there are situations in which a mobile terminal accessing a particular address for a specified non-browser related service cannot be accommodated as requested and, if the desired service cannot be provided, there is no mechanism for providing an indication of such to the user of the mobile terminal. For example, when a mobile terminal establishes a communication link in conjunction with the home agent, the requested application, for example e-mail, may require connecting the mobile terminal to a specified website other than a requested e-mail host web address to enable the mobile terminal to access its e-mail. Moreover, for any one of a plurality of reasons, there may be an event that triggers rerouting the mobile terminal to a different address or application. For example, if the mobile terminal's subscription services are not current, then the mobile terminal may be routed to another website or even have its request for the particular application be denied. As another example, a service being provided at a first level of quality (potentially having an associated cost therefor) may, for any one of a plurality of reasons, require a service being provided at a second level of quality (having a different associated cost therefor). In either situation, the application may be of a type that does not require an open browser window, yet there is no mechanism for providing feedback to the user of the mobile terminal that the application service is being denied or, alternatively, that the mobile terminal is being redirected to a different web address or that a different service is to be provided.

Accordingly, there is a need in a wireless data network for a method and apparatus to provide an indication of whether a service request is being denied or whether a mobile terminal is being routed to a different web address even though such different web address was not requested in those instances in which an application is being accessed without an open browser window and whether a service level or quality is being changed.

SUMMARY OF THE INVENTION

A method and apparatus in accordance with the present invention includes a home agent and a mobile terminal that communicate to facilitate the home agent (or foreign agent) becoming aware of whether the mobile terminal is notification capable wherein, if the mobile terminal is notification capable, the home agent (foreign agent) provides notifications based upon specified events and conditions. The mobile terminal then provides an indication of the notification to the user even though a browser window is not open for displaying user messages. The notification may be in the form of a tone, beep, text message, specified code, etc. The mobile IP registration process according to a mobile IP (or simple IP) protocol is modified to add parameter extensions that allow the mobile terminal to provide this indication that it is notification capable. The home agent is notification capable as well and is capable of providing specified notifications to the mobile terminal upon the occurrence of a specified event without using known browser technology and associated graphical user interfaces for producing graphics and information to a user.

For example, either upon registration or during a mobile IP data session, a particular notification may require being provided to the user of the mobile terminal. In one embodiment of the invention, a mobile IP notification extension (NE) includes a notification code and optional accompanying text describing an aspect of the notification. Generally, however, the home agent only provides such notification if the mobile terminal provided an indication that it is notification capable during a data session or call setup process step. For example, in one embodiment, the mobile terminal provides an indication that it is notification capable as a part of transmitting a registration request. The home agent may produce said notification either in response to call setup processing (e.g., the registration request) or in response during a specified event during a call or data session in the wireless network. With respect to the cellular network, the access technology type may be any one of cdma2000, 1xEV-DO, 1xEVDD, Universal Mobile Telecommunications System (UMTS), General Packet Radio Service (GPRS), or other such standards based specification.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
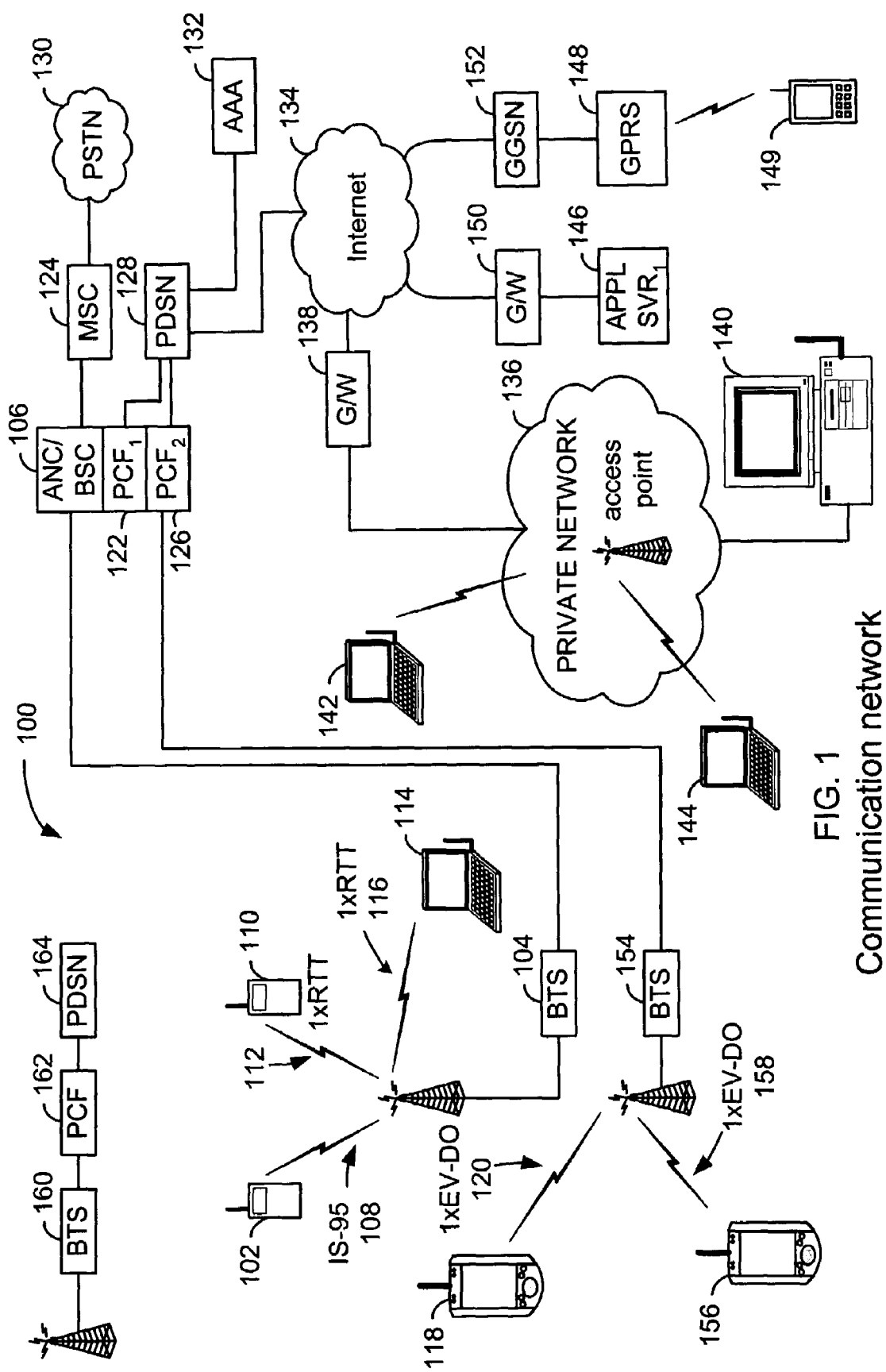
FIG. 1 is a functional block diagram of a communication network formed according to one embodiment of the present invention.

FIG. 1 is a functional block diagram of a communication network formed according to one embodiment of the present invention. As may be seen, a communication network 100 includes many networks that are coupled to operatively communicate with each other to enable a user in one type of network to communicate with a user in a different type of network. For example, the communication network 100 creates an ability for a wire line user terminal coupled to a private network to communicate with a mobile terminal through a wireless communication link. Such transparent operation with respect to the user is improving access to information and the ability for individuals to communicate to a level that is unprecedented. Existing wireless networks have, heretofore, been adapted primarily for carrying voice calls. Accordingly, when used in conjunction with a computer terminal, the wireless voice networks were able to transmit or receive data at rates that today are viewed as unacceptably slow although they were appreciated at the outset.

Along these lines, a mobile station 102 is located within a geographic area served by a Base Transceiver Station (BTS) 104 that is coupled to an Access Network Controller (ANC)/Base Station Controller (BSC) 106. More specifically, mobile station 102 communicates with BTS 104 by way of an IS-95 CDMA wireless communication network link shown generally at 108. Similarly, a mobile terminal 110 that is capable of supporting both voice and data calls communicates with BTS 104 over a wireless communication link shown generally at 112 and establishes either voice calls or data calls under cdma2000 1xRTT protocols. In the example herein, mobile terminal 110 is engaged in a voice call, as defined by a service option generated by a mobile terminal during call setup, and thus wireless communication link 112 is transmitting merely voice signals and associated control signaling.

Similarly, a mobile terminal 114 is engaged in a data call (data session) according to 1xRTT protocols over a wireless communication link shown generally at 116. Finally, an access terminal 118 is engaged in a data session over a wireless communication link, shown generally at 120, according to 1xEV-DO protocols in a so called "simple-IP" or "mobile-IP" network, as those terms are understood by one of average skill in the art. In general, simple-IP and mobile-IP networks do not include control-signaling protocols that are as extensive as some existing systems including 1xRTT.

Continuing to examine FIG. 1, BTS 104 is generally coupled to communicate with ANC/BSC 106 (or with packet control function cards there within). As is understood by one of average skill in the art, access network controllers and base station controllers have similar functionality. Moreover, Packet Control Function (PCF) cards can be installed either within a BSC or within an ANC according to whether the PCF is to communicate with a 1xRTT device or a 1xEV-DO device, respectively. It is to be understood that the BSC and ANC elements may readily be formed as stand alone units, but are shown herein as combined systems for illustration.

Within ANC/BSC 106, a plurality of different wireless network cards is included to facilitate communications with mobile stations and mobile terminals of differing protocols and types. For example, in the described embodiment, ANC/BSC 106 includes circuitry to communicate with mobile station 102 over IS-95 CDMA wireless communication network link as shown generally at 108. ANC/BSC 106 further includes a PCF 122 for communicating with mobile terminals 110 and 114 utilizing 1xRTT protocols. As may be seen, PCF 122, which is for communicating with 1xRTT protocol devices, is coupled to a Mobile Switching Center (MSC) 124. A PCF 126, however, is for communicating with 1xEV-DO devices and thus it is coupled directly to a Packet Data Serving Node (PDSN) 128. Thus, access terminal 118 that communicates over wireless communication link 120 according to 1xEV-DO communication protocols, communicates with BTS 154 and with PCF 126 formed within ANC/BSC 106. It is understood, of course, that PCF 126 may readily be formed as a distinct device rather than within a rack of ANC/BSC 106. Moreover, PCF 126 may communicate with access terminal 118 through distinct radio equipment and, thus, through a BTS other than BTS 154 as shown herein.

MSC 124 further is coupled to a Public Switched Telephone Network (PSTN) 130. Accordingly, calls routed through MSC 124 are directed either to other MSCs (not shown herein) or to external networks by way of PSTN 130. The reference to PSTN herein includes SS7 and other similar "intelligent networks". 1xRTT data and 1xEV-DO calls, which are processed by PCF 126, however, are forwarded through PDSN 128, which, upon authentication by an Authentication, Authorization and Accounting (AAA) server 132, is connected to a data packet network, which, in this example, comprises Internet 134. As may further be seen, Internet 134 is coupled to a private network 136 by way of a gateway device 138. Private network 136 further is coupled through traditional wire line networks to a user terminal 140. Private network 136 is further coupled to mobile terminals 142 and 144 through a wireless network. In one embodiment, private network 136 comprises a wireless local area network with at least one access point which provides access for mobile terminals 142 and 144 and comprises wireless LAN terminals. Private network 136 can include home agents and foreign agents for mobile terminals 136 and 144. Alternatively, a PDSN, such as PDSN 128 or a Gateway GPRS Support Node (GGSN), such as GGSN 152 of a General Packet Radio Service (GPRS) network, may serve as a foreign agent or home agent.

Internet 134 further is coupled to application server 146 by way of gateway device 150. A Global System for Mobile Communications (GSM) mobile terminal 149 is coupled to Internet 134 by way of GPRS network 148. GPRS network 148 represents the GPRS architecture, such as base station controller, mobile switching center, and serving support nodes. GGSN 152 is the interface between Internet 134 and GPRS network 148.

Continuing to refer to FIG. 1, ANC/BSC 106 further is coupled to BTS 154, which is in communication with an access terminal 156 by way of a 1xEV-DO communication link 158. As may be seen, access terminal 156 is served by PCF 126, as is access terminal 118. Additionally, a BTS 160 is coupled to a PCF 162 that, in turn, is coupled to communicate with a PDSN 164. Thus, a mobile station, such as mobile station 102, may communicate with BTS 160, BTS 104, or both. PCF 162, as may be seen, is a standalone system rather than being integrated as a card in an ANC or a BSC.

As will be described in greater detail below, any one of the mobile terminals or access terminals may communicate with a device by way of Internet 134 through a home agent (HA) or a foreign agent (FA) depending on the Internet access point. In the described embodiment, the mobile terminal that is not within the service area of the HA will register with the HA through the FA. The FA accesses network profile information and routes data packets according to the data packet destination address and/or the application type. Data packets not destined for the home network will be routed through Internet access points thereby reducing the amount of data packets transported by the home network infrastructure according to profile information, policy information, and/or according to a destination address. Accordingly, network resources are not unnecessarily used and efficiency is improved.

For each mobile terminal or access terminal, such as mobile terminals 118 and 156, that accesses Internet 134 or private network 136 by way of a home agent or foreign agent, the home agent, by virtue of the use of simple IP or mobile IP protocols, is not ordinarily able to provide required notifications during a particular call or data session that does not include an open browser window. Accordingly, the mobile terminals of the present invention include logic for generating call setup signals, e.g., a registration request that includes parameter extensions to enable the mobile terminal to provide an indication to the home agent that the mobile terminal is notification capable. Accordingly, the home agent can provide specified notifications to the mobile terminal upon the occurrence of specified events. For example, if mobile terminal is being redirected to a new address (presumably one that was not requested), then the HA provides an indication that the mobile terminal that it is being redirected to a different address, as well as a message displaying the address of the location to which the mobile terminal is being redirected (the new address). As another example, a change in service quality may be indicated in a notification message that further includes text describing the new service quality and/or cost therefor. The notifications originated by the HA or an FA are generated for delivery to the mobile terminal.

Figure 2:
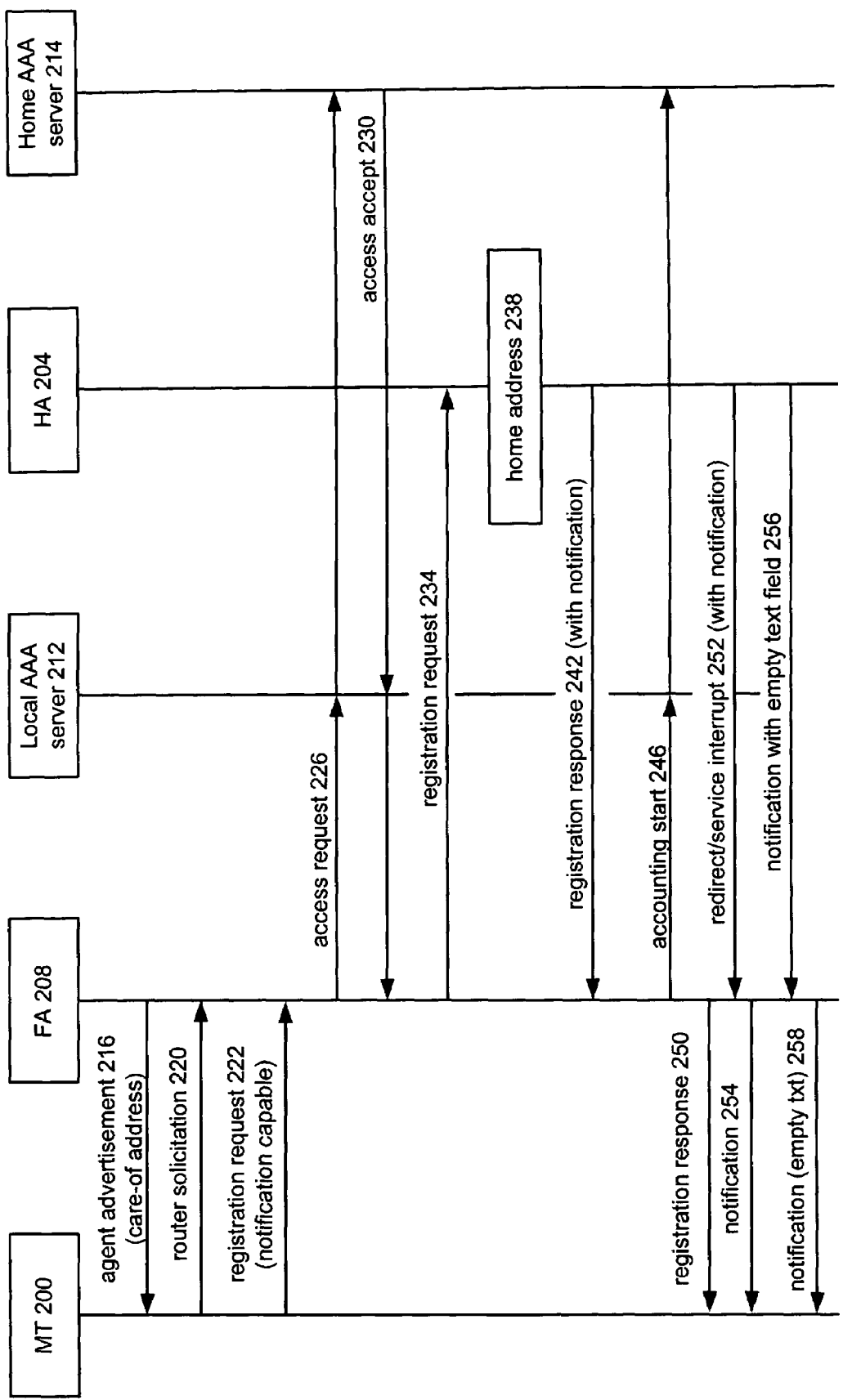
FIG. 2 is a signal sequence diagram that illustrates mobile terminal registration according to one embodiment of the present invention.

FIG. 2 is a signal sequence diagram that illustrates mobile terminal registration according to one embodiment of the present invention. Generally, the invention includes the mobile terminal advising a home agent, either directly or by way of a foreign agent, of its presence in a registration request to gain access to a network. The home agent then may perform billing or other control related functions that are responsive and correspond to the mobile terminal. More generally, as mobile terminal (MT) 200 moves from its home network, a home agent (HA) 204 must update the location of the mobile terminal in a home list. HA 204 is a specially designated server that is responsible for receiving and forwarding data packets to the mobile terminal. Any HA serving a visiting mobile terminal is considered a foreign agent (FA).

As the mobile terminal moves into a foreign (visited) network, it must register its location with its HA. The mobile terminal may use an FA, such as FA 208, to assist with this registration if such an FA is present in the network. In order to obtain profile and other information for a mobile terminal, an HA, such as FA 208, will communicate with a local Authentication, Authorization, and Accounting (AAA) server 212 or with a home AAA server 214. To establish a communication link with MT 200, FA 208 will periodically send out an agent advertisement 216 containing a care-of address. The agent advertisement is a special IP packet periodically broadcast by home agents and foreign agents to notify mobile terminals of their location and that they are available for connectivity. The care-of address is the IP address of FA 208. In the event MT 200 does not receive agent advertisement 216, it will send router solicitation 220. Router solicitation 220 is a message sent by the mobile terminal to discover a foreign agent in order to obtain the care-of address. In the described example, FA 208 receives router solicitation 200. Upon the receipt of either agent advertisement 216 or response to router solicitation 220, MT 200 registers with the HA. MT 200 will send, in the described embodiment of the invention, registration request 222 containing an indication that MT 200 is notification capable.

FA 208 will, upon receiving registration request 222, send access request 226 containing the mobile terminal identification (including device type and access technology in one embodiment) to local AAA server 212. Access request 226 is, generally, a signal for identifying the mobile terminal to establish accounting for services used. Local AAA server 212 is a specialized server that verifies MT 200 authentication. Local AAA server 212 then forwards access request 226 to home AAA server 214 which responds with access accept 230 for an authenticated mobile terminal to indicate the mobile terminal is authorized to access the Internet. Once authentication has been received, FA 208 sends registration request 234, containing the care-of address of FA 208, to HA 204 which stores the care-of address of FA 208 in the MT 200 profile. When HA 204 receives a data packet addressed to MT 200, HA 204 will encapsulate the data packet with the care-of address and forward the encapsulated data packet to PA 208.

HA 204 returns a home address 238 with registration response 242. In general, registration response 242 is a reply from the HA to the mobile terminal used to complete the registration process. If MT 200 is assigned a static IP address, HA 204 returns the static IP address as the home address. For a dynamic addressing, HA 204 will assign an IP address and return the IP address as the home address with registration response 242. FA 208 sends accounting start 246 then sends registration response 250 to MT 200. MT 200 is now registered and can access the home network or any other data packet network.

If, during the above described process, the HA is required (for any reason) to redirect MT 200 to an address other than that which is requested (or required for a requested service) or if the HA is required to provide any other notification information to the mobile terminal, then the invention includes providing notification to MT 200 by way of FA 208 of the same. In this described embodiment, the notification is provided in response to registration request 234 in registration response 242 as an MIP RRP (mobile IP registration response) with a defined notification and a text field that defines specifics of the notification. For example, the defined notification may be "Redirect" and the accompanying text may be "User has been redirected to http//www.xyz.com". Alternatively, the defined notification may be "Request Denied" and the accompanying text may be "Service Temporarily Unavailable".

If appropriate, the invention further includes initializing a corresponding accounting process to bill for the specified service in accounting start 246 that is produced by FA 208 to Home AAA server 214 and producing a registration response 250 to MT 200 to advise it either that the requested service is being provided or is being denied as well as any accompanying notification messages (if any). If requested service is provided and, during the call or data session, MT 200 is to be redirected or if the call or data session is interrupted, a redirect/service interrupt mobile IP notification message 252 is produced by HA 204 to FA 208 for delivery to MT 200 with the defined notification message and any accompanying text. Accordingly, FA 208 produces notification message 254 to MT 200 with the notification and accompanying text, if any.

Finally, the signal sequence diagram of FIG. 2 further illustrates a method according to one embodiment of the present invention for clearing a previously submitted notification. Specifically, one of a home agent or a foreign agent may generate a notification message 256 with an empty text field to clear a previously submitted notification with text field. A notification with an empty text field may also be sent as a part of registration response 242. Generally, this embodiment contemplates a mobile terminal that displays whatever is received in a text field of a notification message. Accordingly, an empty text message is produced to MT 200 in either signals 250 or 258 to prompt the mobile terminal to "display" the empty text field thereby effectively clearing the previous display.

Figure 3:
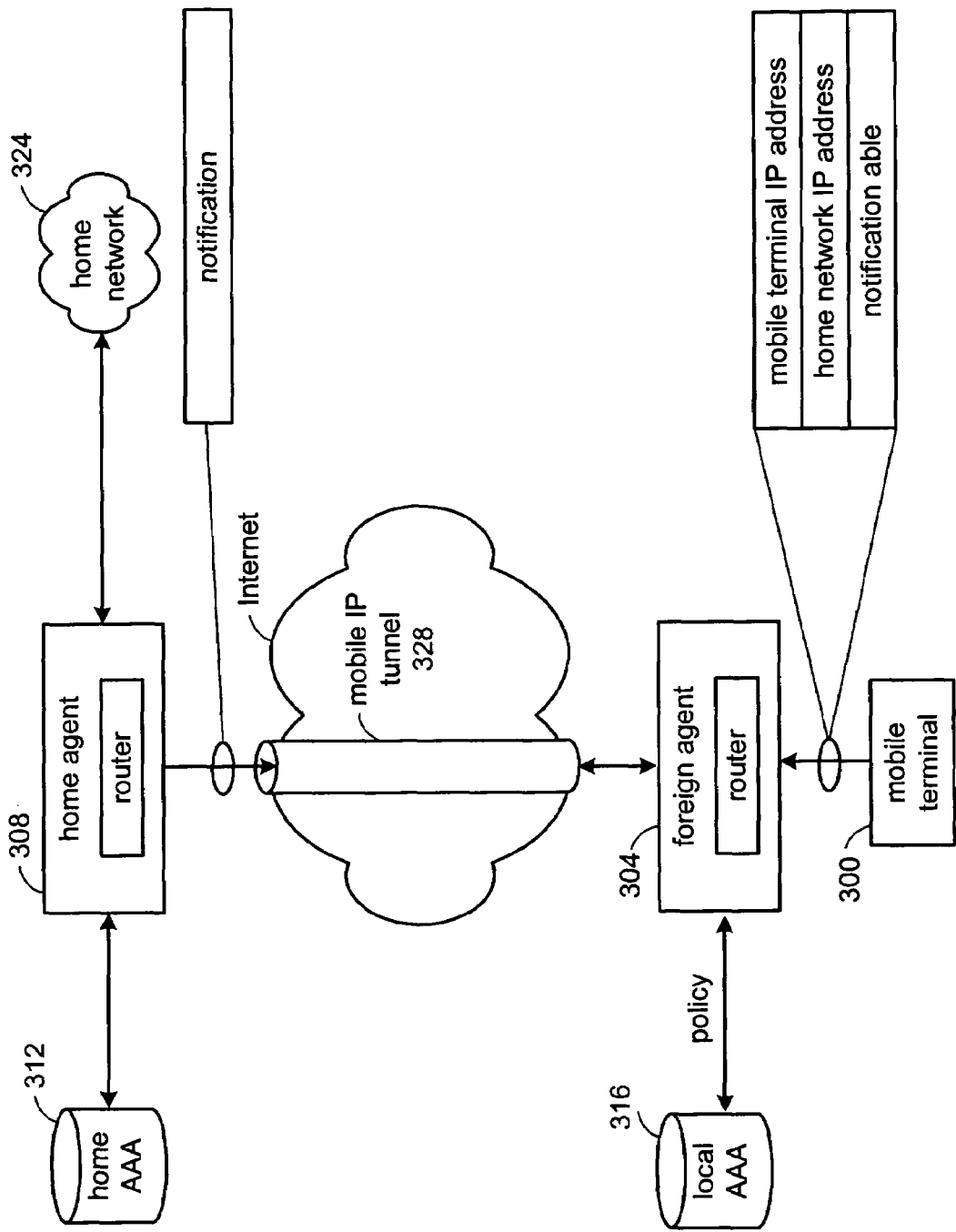
FIG. 3 is a functional block diagram that illustrates registration and call setup according to one embodiment of the present invention.

FIG. 3 is a functional block diagram that illustrates registration and call setup according to one embodiment of the present invention. More specifically, a mobile terminal 300 registers with foreign agent 304 and home agent 308 by way of mobile IP tunnel 328. During or subsequent to the registration process, foreign agent 304 receives mobile terminal information from home authentication, authorization and accounting (AAA) server 312 via local AAA server 316. When mobile terminal 300 attempts to access a data packet network, such as home network 324, foreign agent 304 will access local AAA server 316 and route the data packets accordingly. As may be seen, mobile terminal 300 produces its mobile terminal IP address, home network IP address, and optionally device type and access technology, in one or more communications with foreign agent 304. In the described embodiment, said information is transmitted in a registration request signal.

The routing is based upon one of a network policy and a subscriber policy in relation to, among other factors, device type and access technology in one embodiment of the invention. The network policy can specify routing data packets according to an address specified by the mobile terminal or based on an application type associated with the data packet. The application type includes home network 324 applications such as e-mail, file sharing, and establishing a session initiation protocol (SIP) for video conferencing and telephony over IP-based networks. If the application type is of a type specified for home network 324 and device type and access technology, foreign agent 304 will encapsulate the data packet creating mobile IP tunnel 328 for routing the data packet to home agent 308 for forwarding to home network 324. The data packet will be routed to the Internet if the application type is not of a type specified by the network policy. The network policy may also specify routing based on a destination address such as the address of a network node in home network 324. According to routing policy rules, foreign agent 304 either routes data packets to a destination address or to home agent 308. If, for some reason, foreign agent 304 cannot route data packets to a requested or specified web address location, then foreign agent 304 provides notification of the same to mobile terminal 300. Moreover, if the packets are routed to home agent 308 prior to being connected to a specified web address location and home agent 308 determines that the mobile terminal cannot be "connected" to the web address location, then home agent 308 generates a notification message for delivery to mobile terminal 300 by way of mobile IP tunnel 328 and foreign agent 304.

Home AAA server 312 may also specify subscriber profile information. Information stored in home AAA server 312 will be accessed by foreign agent 304 during registration via local AAA server 316. Foreign agent 304 will use the information received via local AAA server 316 when mobile terminal 300 accesses a data packet network. Foreign agent 304 will apply the subscriber profile for mobile terminal 300 to route the data packet according to at least one of a destination address, specified application type, device type and access technology. In any of the above embodiments, the invention includes the mobile terminal transmitting an indication that it is notification able and also includes the home agents and the foreign agents transmitting notification.

Figure 4:
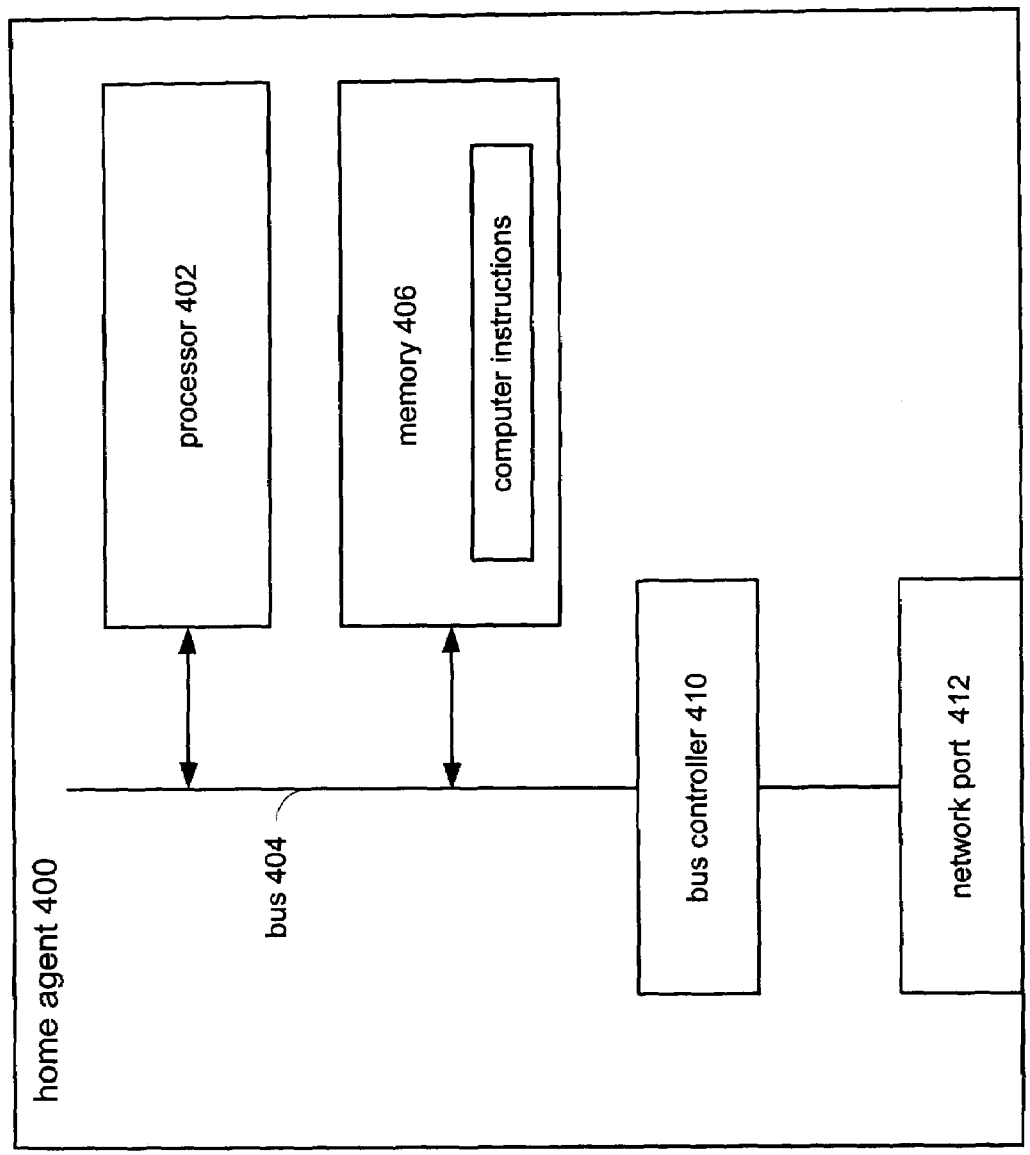
FIG. 4 is a functional block diagram of a home agent according to one embodiment of the present invention.

FIG. 4 is a functional block diagram of a home agent according to one embodiment of the present invention. Home agent 400 includes a processor 402 that is coupled to communicate over a bus 404. A memory 406 further is coupled to bus 404 and is for storing computer instructions that define the operational logic of home agent 400 including notification logic as described herein. Memory 406 specifically includes computer instructions to cause home agent 400 to add notification information to registration reply messages transmitted to a mobile terminal. Bus 404 further is coupled to a bus controller 410, which controls the communications and timing of communications thereon. Bus controller 410 is further coupled to a network port 412 that enables home agent 400 to communicate with a mobile IP network. Network port 412 can be one of any type of transceiver front end, including those used in wireless as well as wireline technologies.

In operation, processor 402 communicates with memory 406 by way of bus 404 to retrieve computer instructions stored therein and to execute the computer instructions to operate according to the logic defined within the computer instructions of memory 406. Memory 406 specifically includes computer instructions that define the logic for performing registration of a mobile terminal. Additionally, computer instructions stored in memory 406 define logic for determining an access technology by which the home agent is to send the registration replies including specified notifications and, more generally, communicate with a mobile terminal by way of a mobile IP tunnel and a foreign agent. Finally, the computer instructions include logic for generating any one of a plurality of notifications that are sent either as a part of a registration reply or during a call or data session to provide notification of a specified event. The logic, however, is directly related to mobile IP and simple IP technology devices that do not have means for providing notifications outside of a browser window (without using an open browser window).

Figure 5:
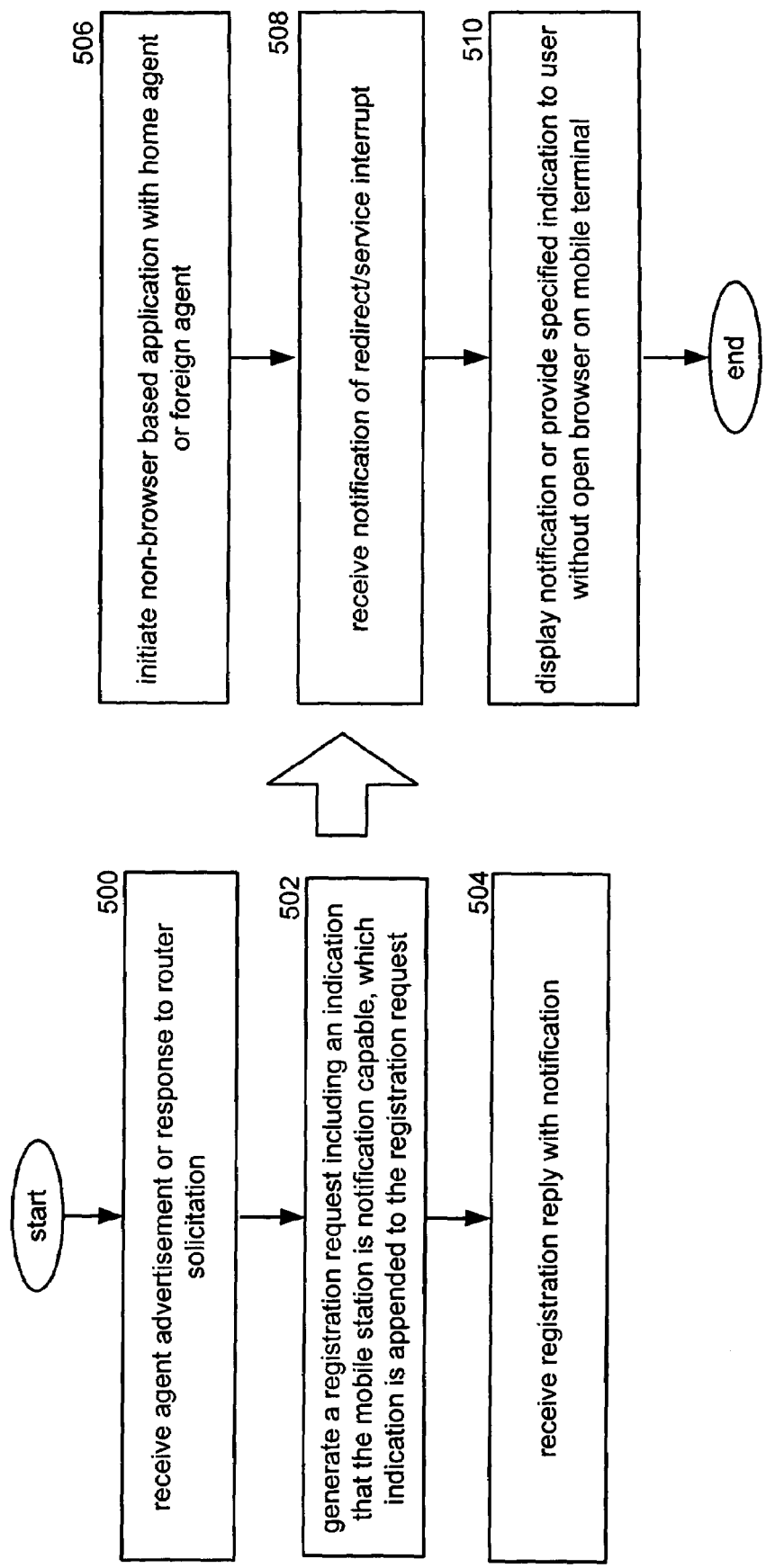
FIG. 5 is a flowchart illustrating one method according to the present invention.

FIG. 5 is a flowchart illustrating one method according to the present invention. A mobile terminal initially receives an agent advertisement or a response to a router solicitation that the mobile terminal transmitted in order to locate an access point (step 500). In a cellular network, the mobile terminal receives a beacon or paging signal that indicates the presence of a base station. The mobile terminal then generates a registration request including an indication that it is notification capable, which indication is appended to the registration request in one embodiment of the invention (step 502). For example, if the mobile terminal receives an agent advertisement or response to a router solicitation, as well as a beacon or paging signal from a base station, the mobile terminal has a plurality of means for accessing a network. Thus, the mobile terminal may choose the cellular network to satisfy throughput requirements for a specified application, or may choose the lowest cost access technology which, more than likely, will be the WLAN since WLANs are typically operated by private organizations or individuals. Regardless of the access technology, however, the registration request signal includes an indication that the mobile terminal is notification capable as defined herein this application.

The mobile terminal subsequently receives a registration reply with notification if a specified event or condition warrants a notification being sent to a registering mobile terminal (step 504). The notification can be of any type described herein and generally includes a specified notification with associated text messages if so required. One notification specifically included is that the mobile terminal is to be redirected to an alternate web address location. If service is not denied or if the mobile terminal is not redirected to an alternate web address location, the mobile terminal initiates a non-browser based application with the home agent or foreign agent (step 506). In the described embodiment of the invention, a registration request is generated and transmitted to one of a base station or access point. Thereafter, once a particular data session or call type is initiated, the invention includes receiving notification of redirect/service interrupt in a notification message with corresponding text describing the redirect/service interrupt (step 508). Thereafter, the mobile terminal displays the notification text or provides a specified indication to the user without an open browser on the mobile terminal (step 510). If, during the data session, the mobile terminal data session is interrupted or if, for some reason such as a server or line failure, the mobile terminal session is to be terminated or suspended or redirected, notification of the same is provided so that the user may understand the interruption or delay in service. Finally, a home agent or foreign agent may produce a notification message to a mobile terminal as described herein with an empty text field to clear or erase a previously submitted text message as a part of a notification.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed:

1. A mobile IP network; comprising:
  - a mobile terminal that provides an indication, within a registration request signal for a non-browser based application, of having a notification capability;
  - a home agent (HA) that receives and processes a registration request with the indication of notification capability wherein the HA provides one of a redirect notification or a service notification if a specified service request cannot be provided; and
  - wherein the mobile terminal stores the redirect notification or service notification in a specified manner without using a browser window.

2. A home agent (HA) for serving a mobile terminal in a mobile IP network, comprising:
  - a processor for executing computer instructions that define operational logic of the HA;
  - a bus coupled to the processor for transmitting computer instructions and control signals to and from the processor within the HA;
  - a bus controller for controlling communications and timing of communications thereon;
  - a network port for coupling the HA to a wireless communication network to enable the HA to communicate with the mobile terminal;

memory coupled to the bus, the memory including the computer instructions that define operational logic for routing data packets between the mobile terminal, the defined HA and a web server;

the memory further including computer instructions that define logic for communicating with the mobile terminal;

wherein the HA receives a registration request from the mobile terminal including an indication that the mobile terminal is capable of receiving and processing a specified indication which specified indication includes one of a redirect notification or a service notification if a specified service request cannot be provided; and wherein the HA provides one of the redirect notification or the service notification if the specified service request cannot be provided.

3. The HA of claim 2 wherein the redirect notification is provided to the mobile terminal even though a browser page is not activated on the mobile terminal.

4. The HA of claim 3 wherein the redirect notification is provided to the mobile terminal along with an indication of a web site address to which the mobile terminal is being redirected.

5. The HA of claim 4 wherein the mobile terminal is redirected in response to the registration request.

6. The HA of claim 4 wherein the mobile terminal is redirected while in a mobile IP data session.

7. The HA of claim 2 wherein the HA sends an empty notification message to the mobile terminal to prompt the mobile terminal to clear out a previously received notification message.

8. A mobile terminal for use in a mobile IP network, comprising:

a processor for executing computer instructions that define operational logic of a home agent (HA);

a bus coupled to the processor for transmitting computer instructions and control signals to and from the processor within the HA;

a bus controller for controlling communications and timing of communications thereon;

transceiver circuitry for enabling the mobile terminal to communicate with the HA by way of a communication network;

memory coupled to the bus, the memory including the computer instructions that define operational logic for establishing a communication link with the HA; and wherein the mobile terminal produces a registration request including an indication that the mobile terminal is capable of receiving and processing a specified indication which specified indication includes one of a redirect notification or a service notification if a specified service request cannot be provided.

9. The mobile terminal of claim 8 wherein the mobile terminal receives and processes the redirect notification even though a browser page is not activated on the mobile terminal.

10. The mobile terminal of claim 9 wherein the mobile terminal receives the redirect notification along with an indication of a web site address to which the mobile terminal is being redirected and wherein the mobile terminal displays at least a portion of the web address provided with the redirect notification.

11. The mobile terminal of claim 10 wherein the mobile terminal receives and processes the redirect notification in response to the registration request.

12. The mobile terminal of claim 10 wherein the mobile terminal receives and processes the redirect notification in a mobile IP data session.

13. The mobile terminal of claim 8 wherein the mobile terminal receives and processes the redirect notification with an empty notification message and further wherein the mobile terminal clears a previously received notification message.

14. A method by one of a mobile terminal and a home agent in a mobile IP network, comprising:

the mobile terminal transmitting a registration request, the registration request indicating that the mobile terminal is notification capable for receiving redirect notification even though a browser window is not open;

the mobile terminal receiving a notification, without having an open browser window, indicating one of a service notification or a redirect notification reflecting that the mobile terminal is being redirected to a web site not requested by the mobile terminal; and the mobile terminal providing an indication of the notification to a user of the mobile terminal.

15. The method of claim 14 wherein the mobile terminal receives the notification in response to a registration request message generated by the mobile terminal.

16. The method of claim 14 wherein the mobile terminal receives the notification in a mobile IP data session.

17. The method of claim 14 wherein the home agent receives an indication that the mobile terminal is notification capable.

18. The method of claim 17 wherein the home agent determines that a notification is to be provided to the mobile terminal.

19. The method of claim 18 wherein the home agent provides notification to the mobile terminal in response to the registration request message.

20. The method of claim 18 wherein the home agent provides notification to the mobile terminal during an established mobile IP data session.

* * * * *